May 10, 1949. H. R. POLLEYS 2,469,518
SOLE CUTTING MACHINE
Filed July 2, 1947 2 Sheets-Sheet 2
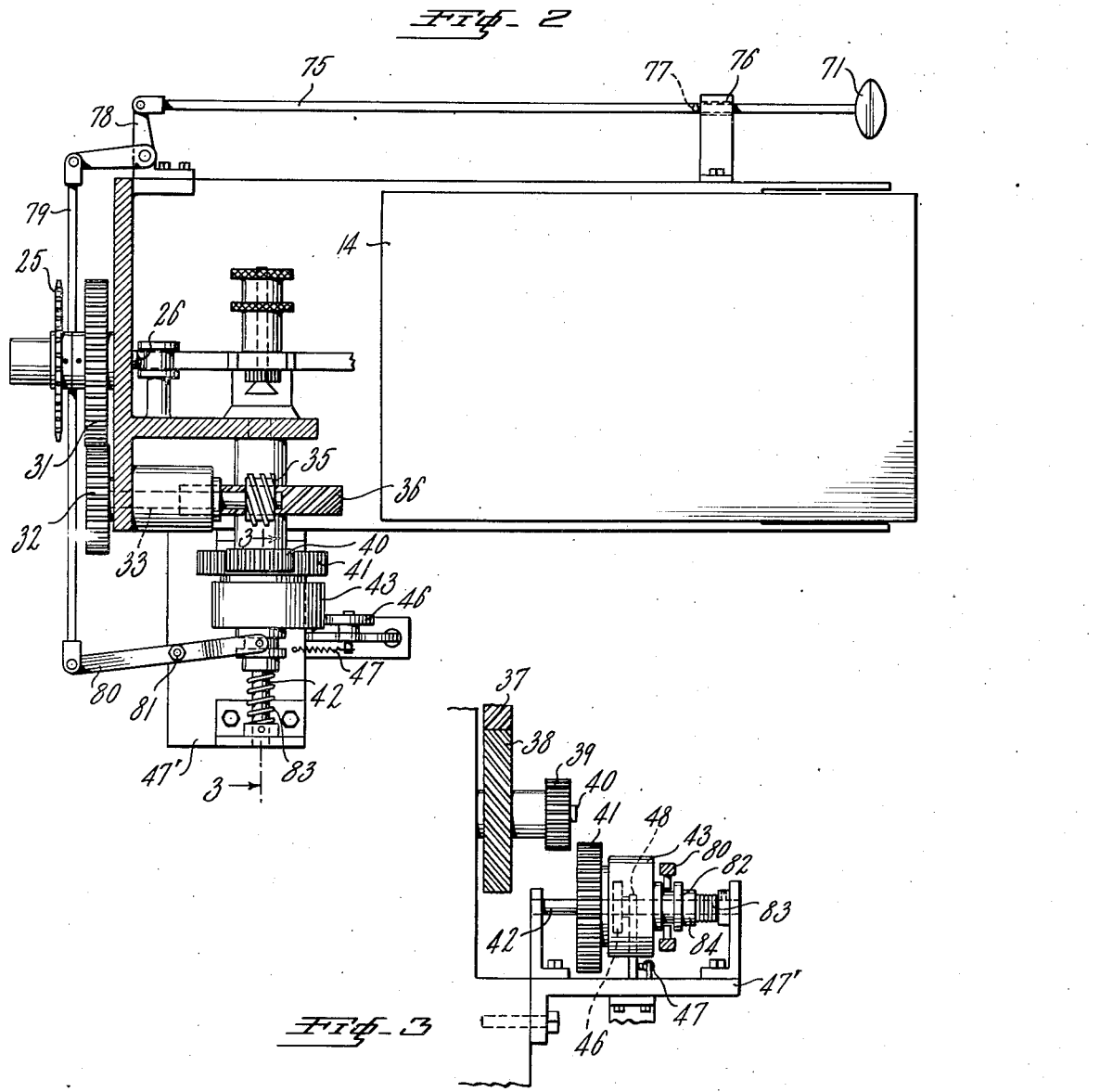
INVENTOR.
HERBERT R. POLLEYS
BY William R. Epes
ATTORNEY Patented May 10, 1949

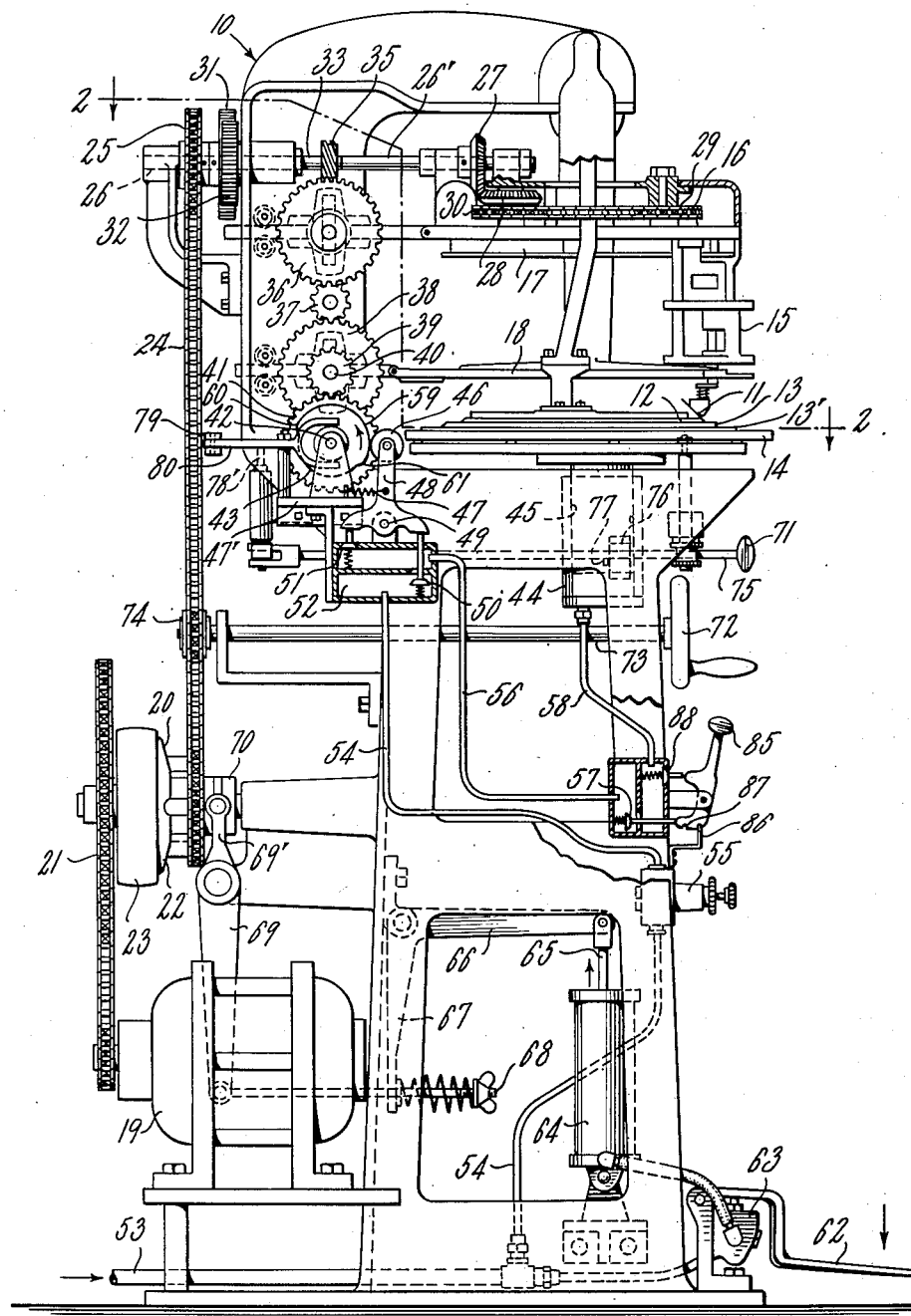

2,469,518

UNITED STATES PATENT OFFICE 2,469,518

SOLE CUTTING MACHINE

Herbert R. Polleys, New Haven, Conn., assignor to Wellman Company, Medford, Mass., a corporation of Maine Application July 2, 1947, Serial No. 758,529

8 Claims. (Cl. 12—25)

This invention relates to a sole cutting machine comprising a mechanism for driving a cutting knife in a circuit around the edge of a sole to be cut from a sheet of sole stock which is supported on a table adapted to reciprocate the stock into and out of the path of travel of the knife. The invention relates particularly to a mechanism for synchronizing the travel of the knife with the reciprocating movement of the table, so as to automatically cause the knife to enter and be withdrawn from the stock when it is at certain positions on its path of travel, and provide a sufficient period of time between the successive withdrawals and entries of the knife to permit the stock to be shifted on the table into position to have the next sole cut therefrom.

The improvement embodying this invention is particularly adaptable to machines of the type illustrated in prior patents to E. L. Patten, No. 1,418,604, granted June 6, 1922, and to P. J. McGowan, No. 1,645,441, granted October 11, 1927. In the machines illustrated in the above patents the sole cutting knife was driven in a circuit around a form, or templet having substantially the shape of the sole, and the sheet stock from which the sole was to be cut was supported on a table movable up and down underneath the form. The knife was driven by a power drive having a friction clutch interposed between it and the knife drive. The clutch was actuated by the reciprocating movement of the table to connect the power drive to the knife drive on its upward movement and disconnect such drives on its downward movement.

To place the prior machine into operation, the power drive was started with the table down. The operator placed a sheet of sole stock on the table in position for cutting the first sole therefrom, and placed his foot on a pedal which caused the table to rise. The upward movement of the table threw the clutch into engagement and started the knife to travel around its circuit just before the sole stock was moved into the path of the knife, and immediately afterwards the stock was clamped in the path of the knife between the table and the abutment formed by the templet. A sole was cut out while the stock was so clamped and while the knife made a complete circuit around the templet from its point of entry into the stock. The operator then removed his foot from the pedal and permitted the table to descend by its own weight and cause the knife to be withdrawn from the stock. The downward movement of the table disengaged the clutch and the knife coasted around the templet with sufficient momentum to carry it around its circuit several times before coming to a stop. While the table was down, the operator shifted the stock to a new position under the knife for cutting the next sole. The remainder of the soles obtainable from the same sheet of stock were cut by repeating the same operations, excepting the table was started on its upward movement while the knife was still in motion, in order to save time and power required to stop or permit the knife to stop and start it again.

Machines of the type with which this invention is concerned are adapted to cut bevel edges on the soles and for that purpose the cutting knife is inclined to the surface of the sole and downwardly and outwardly from the circuit of the knife. In order to prevent the knife from being broken when it encounters the stock upon the upward movement of the table, it is essential that the knife be traveling at a relatively high speed when it enters the stock. In the prior machines frequent adjustments of the clutch and the linkage connecting it to the table movement was required to maintain the accurate adjustment necessary to produce the desired speed. When the accurate adjustment was not maintained the knife was often broken, and if not ragged edges were formed on the sole.

Another essential in the operation of the machine is that the knife should not enter or be withdrawn from the sole stock at portions on the edge of sole having sharp curvatures, such as at the heel and toe, because blemishes may be formed on the edge of the sole.

In the prior machines in the case where the knife was at rest when the table started upwards, as in the cutting of the first sole from a sheet, it was necessary to start the knife from a certain portion of its path depending upon the clutch and linkage adjustment in order to cause the knife to enter the stock at the desired point on the edge of the sole. If the adjustments should change, the setting point of the knife would also be changed, and if the knife failed to stop at the setting point it was necessary to manually move the knife to such point with the attendant loss of time by the operator. In the case where the knife was moving when the table started upward, as in the cutting of soles after the first from a sheet of stock, considerable skill was required of the operator to cause the knife to enter and be withdrawn from the stock at the desired points, because it was necessary for him to actuate the table when the knife was at a certain position on its path just in advance of the desired points on the edge of the sole, which position was determined by watching the knife and feeling the rhythm of the machine. A loss in production time was sometimes incurred by the operator failing to raise and lower the table on the first available revolution of the knife for the entry or withdrawal of the knife, and thus permitting it to travel one or more revolutions in or out of the stock than required.

Furthermore the motions of repeatedly stepping on the foot pedal and releasing it to raise and lower the table for the cutting of each individual sole was fatiguing to the operator, and the repeated engagement and disengagement of the clutch increased the wear on the clutch and the knife driving mechanism.

The present invention is an improvement upon the foregoing functions of the prior machines and the mechanism for performing such functions. Accordingly, the movement of the sole stock by the supporting table into and out of the path of the cutting knife is controlled by and is synchronized with the travel of the knife in such a manner that when the knife has started to operate, it may be operated continuously at a substantially constant high speed while all of the soles are cut from a single piece of sheet stock. During such operations, the stock is automatically carried into the path of the knife and removed therefrom while the knife is in the desired positions on its path of travel to cause the knife to enter and be withdrawn from the cut at the desired preselected positions on the edge of the soles being cut. Such positions can be preselected as further described.

The present apparatus is an improvement upon the prior apparatus in the following respects: (1) The continuous rotation of the knife during the cutting of a set of soles from a single piece of stock reduces the wear on the clutch and allied mechanism, which heretofore resulted from the engagement and disengagement of the clutch for each sole cut out. (2) The operator is subjected to less fatigue, because he is relieved of the manual work required to operate the table controls to cause the stock to be moved into and out of the path of the knife at the beginning and the end of the cut for each sole. (3) Less skilled operators are required, because once the machine is adjusted it remains in adjustment so as to cause the knife to automatically enter and be withdrawn from the stock at the desired preselected points to prevent blemishes. (4) Blemishes or ragged edges and knife breakage are reduced because the knife always enters the stock at the preselected points and at its normal high cutting speed. (5) A greater production may be obtained from each machine because the machine operates on a continuous cycle while the several soles are being cut from a single sheet, and wasteful knife coasting between the cutting of each sole is eliminated.

The invention will be further described with reference to the accompanying drawings, in which:

Fig. 1 is a side elevational view of a sole cutting machine having the improvements embodying this invention incorporated therein;

Fig. 2 is a cross sectional view of the machine shown on line 2—2 of Fig. 1, in which the improved mechanism embodying this invention is particularly shown; and Fig. 3 is an elevational view of the mechanism taken on line 3—3 of Fig. 2, but showing it in a different position.

As shown in Fig. 1 of the drawings, this invention is illustrated in connection with a sole cutting machine of the type particularly disclosed in the McGowan Patent No. 1,645,441. The McGowan machine 10 comprises a cutting knife 11 which is driven around a templet or form 12 of the shape of the sole to be cut from a sheet of stock 13, which is supported on a cutting pad 13' carried by the table 14 and is clamped between the templet 12 and the table.

The knife 11 is driven in a circuit around the templet 12 by a carriage 15, which is directly connected to and driven by the chain 16 and guided in a circuit above the templet 12 by the upper and lower leaders or guide tracks 17 and 18, which are particularly shown and described in the E. L. Patten Patent No. 1,270,319. The chain 16 is driven by a motor 19 through a clutch 20 which is geared to the motor by a chain 21. When the engageable and disengageable parts 22 and 23 of the clutch 20 are in engagement, the knife 11 is driven from the clutch 20 through a sprocket chain 24, which meshes with the sprocket wheel 25 geared to a shaft 26. A shaft 26' is driven by a slidable connection with the shaft 26, and it drives the chain 16 through the bevel gear 27 keyed to the shaft 26' and which meshes with the bevel gear 28. The chain 16 passes over sprockets 29 and 30 and is driven by the sprocket 30 which is keyed to the shaft to which the bevel gear 28 is affixed.

The track guides 17 and 18 are shifted by a train of gears, which are driven from the shaft 26 by a gear 31 affixed thereto, and which drives the gear 32 which is keyed to a shaft 33, on which is keyed a spiral gear 35, which drives the train of gears 36, 37 and 38 which reciprocate the track guides 17 and 18.

The improvement embodying the present invention, as shown herein, is driven from a gear 39, which is keyed to a shaft 40 on which the gear 38 is affixed. The gear 39 is adapted to drive a gear 41 which is slidably mounted on a shaft 42 (Figs. 2 and 3). A wide faced cam 43, slidably mounted on the shaft 42 and affixed to the gear 41, controls the reciprocating movements of the table 14 and synchronizes them with the travel of the knife 11 by causing fluid under pressure to be admitted to and exhausted from the lower end of the cylinder 44 to operate the piston 45 therein, which operates the table 14. The mechanism for performing such functions comprises a cam roller 46 which rolls on and is held in contact with the surface of the cam 43 by a spring 47 having one of its ends affixed to a stationary support 47' and its other end affixed to a lever 48. The cam roller 46 is mounted on the valve operating lever 48 which is pivoted on a pin 49, and is provided with lateral arms which are adapted to operate an inlet valve 50 and an exhaust valve 51, respectively, which are adapted to admit and exhaust compressed air to and from the cylinder 44.

Compressed air is admitted to the valve chamber 52 through a supply pipe 53, to which is connected a branch pipe 54 having a pressure regulator 55 inserted therein and leading to the chamber 52. The regulator is adapted to control the clamping pressure between the templet 12 and the table 14. As shown in Fig. 1, the inlet valve 50 is open and air is being admitted through the pipe 56, manually operated normally open valve 57, and pipe 58, to the lower end of the cylinder 44. The stock 13 is clamped against the templet 12, and the knife 11 is traveling around the templet in the act of cutting a sole from the stock. The inlet valve 50 is being held in its open position by the higher cam surface 59 acting upon the cam roller 46 against the action of the spring 47. The valve 50 was moved to its open position when the knife 11 was in the desired position on its path of travel for entry into the stock 13, which occurred when the rise 60 on the surface of the cam made contact with the cam roller 46. After such occurrence the knife 11 makes a complete circuit plus some overlap around the edge of the sole. The cam roller 46 then runs down the rise 61 on the cam surface and travels along the lower surface of the cam. As the roller runs down the rise 61 the inlet valve 50 is closed and the exhaust valve 51 is opened, which permits the table 14 to be lowered by virtue of its weight, and the knife 11 is thereby withdrawn from the stock 13 at the desired position on the edge of the sole. The table remains in its downward position until just before the knife 11 returns to the position on its path where it previously entered the stock 13, and at which time the cam rise 60 again makes contact with the roller 46. When the table is down the cutting pad 13' with the stock 13 thereon is shifted on the table by the operator to a position for cutting the next sole. Such successive operations are continued until all of the soles have been cut from the single sheet of sole stock 13 initially placed upon the table 14 at the beginning of the operation. While the several soles are being cut the operator holds his foot on the foot pedal 62 which admits air from the supply line 53 through the valve 63 to a cylinder 64, which operates a piston therein to hold the clutch 20 in engagement with the drive from the motor 19. Motion is transmitted to the movable member 22 of the clutch 20 from the piston rod 65, through a linkage comprising a bell crank lever 66 having an arm 67 which yieldably actuates a rod 68, connected to a lever 69 having a yoke 69' thereon which actuates the clutch collar 70 to connect the knife drive to the motor 19.

After the table has moved upwardly for cutting the last sole from the sheet of sole stock 13 the operator removes his foot from the foot pedal 62 which exhausts the air from the cylinder 64 and disengages the clutch 20. The knife 11 has sufficient momentum to complete the cut, and it will come to a stop while the table 14 is in its lower position. In such position a new sheet of stock may be placed on the table in position to be operated upon by the knife in succession after each sole is cut therefrom. After placing the sheet of stock on the table in the desired position for cutting the first sole, the operator steps upon the pedal 62, and while the pedal is being held down by the operator's foot, the machine repeats the successive operations of cutting the soles therefrom, and it is only necessary for the operator to shift the stock to a new position for cutting the next sole each time the table 14 is lowered out of the path of the knife 11, since the cam 43 and its allied mechanism automatically causes the knife 11 to enter and be withdrawn from the stock at the same places on the edge of each sole.

As shown in the drawings, the table 14 is reciprocated through one cycle, that is moved up and down, during the time the knife travels twice around its path of movement. The stock is held in the path of the knife while it makes slightly more than one revolution, and it is held out of the path of the knife while it completes the remaining portion of the revolution, which is slightly less than one revolution. Such operating characteristics are obtained by driving the cam 43 through one revolution while the knife 11 is driven through two revolutions, and making the high portion of the cam extend through an angle of slightly more than 180°. It will be understood that the gear ratio between the knife drive and the cam 43 and/or the angular length of the high portion of the cam in respect to the low portion may be changed to cause the stock to be held in the path of the knife during a plurality of revolutions of the knife, with or without changing the angular travel of the knife while the stock is being shifted on the table. For example, if the present cam 43 were rotated one revolution for every four revolutions of the knife, the knife would go around in the sole cut a little more than two complete revolutions, and the knife would make a little less than two revolutions between the withdrawal and entry of the knife for cutting the next sole. Or, if the high portion of the cam 43 were altered to extend through a little more than 240°, and the cam were rotated one revolution to every three revolutions of the knife, the knife would travel around the cut in the sole twice plus an overlap, and a little less than one revolution of the knife would be provided for the shifting of the stock on the table after the withdrawal of the knife.

The geared relationship between the knife 14 and the rises 60 and 61 on the cam 43 may be changed to cause the rises to make contact with the cam roller 46 while the knife 11 is at any position on its 360 degree path of travel, and thereby cause the knife 11 to enter and be withdrawn from the stock 13 at any desired position on the edge of the shoe sole being cut. The change in such geared relationship may be made while the cam roller 46 is on the lower surface of the cam 43 adjacent to the rise 60, the clutch 20 is out of engagement, and the knife is not in motion. Under such conditions the knob 71 is pulled outwardly to shift the gear 41 out of the mesh with the gear 39 (as shown by the position of such gears in Fig. 3 of the drawings), and slide the face of the cam 43 under the roll 46. While the gears 39 and 41 are thus out of mesh, the knife 11 may be turned to the position just behind the position it should enter the stock by manually operating the hand wheel 72. The wheel 72 is affixed to a shaft 73 and turns a sprocket wheel 74 with which the knife drive chain 24 meshes, and which is driven by a one way clutch in the nature of a ratchet located in the wheel 74 and driven by the shaft 73. The knob 71 is then pushed inwardly and the gears 39 and 41 are again thrown into mesh with each other without any appreciable change in the angular movement of the cam 43 during the sliding movement of its face on the roller 46. In such adjusted position the knife will be caused to enter the stock just beyond the point at which it is set by virtue of the rise 60 causing the valve 50 to be opened.

The linkage which connects the knob 71 to the mechanism for shifting the gear 41 out of mesh with the gear 39, comprises a rod 75 which extends through a fixed collar 76 and is provided with a lug 77 thereon which cooperates with the collar 76 to hold the gears in or out of mesh as may be desired. The lug 77 as shown in Figs. 1 and 2 is in the gear meshing position. The gears 39 and 41 are disengaged by lifting the rod until the lug 77 is raised above the bottom of the interior wall of the collar 76. The lug is then pulled through the collar and dropped down on the opposite side of the collar, where it holds the gears 39 and 41 out of mesh. One end of the rod 75 is connected to a bell crank lever 78 comprising lower and upper arms which are secured to a vertical shaft 78' pivoted on the frame of the machine, and the other arm of the lever is connected to a rod 79 at the rear of the machine. The rod 79 operates a clutch shifter lever 80 on the other side of the machine. The lever 80 is pivoted on a pin 81 and it operates a collar 82 longitudinally of the shaft 42 upon which the gear 41 and cam 43 are slidably mounted. The gear 41, cam 43, and shift collar 82 are secured together and rotate as a unit on the shaft 42. The movement of the lever 80 in the direction to pull the gears 41 and 39 out of mesh compresses a coiled spring 83 surrounding the shaft 42. A thrust collar 84 is interposed between the spring 83 and the shift collar 82. The spring 83 holds the gears 41 and 39 in mesh with one another, excepting when the rod 75 is pulled outwardly and is retained in such outward position by the lug 77.

Means are provided for lowering the table 14 in the event the knife should become jammed or broken and stop while the cam roller 46 is on the upper surface 59 of cam 43, and thereby hold the inlet valve 50 open and the table operating piston 45 in its upper position. In the event that should happen, the air may be exhausted from the cylinder 44 by pushing in the handle 85 and thereby close the inlet valve 57 and open the exhaust valve 88 to the atmosphere, which would permit the table to descend by virtue of its weight. The handle 85 is automatically locked in either the opened or closed positions of the inlet valve 57 by the fixed detent 86 falling into one of the recesses 87 on the handle 85. The stock is then removed out of its jammed position with the knife 11 or other parts of the machine. The hand wheel 72 is then turned until the low portion of the cam 43 comes in contact with the cam roller 46 which causes the inlet valve 50 to be closed and the exhaust valve 51 to be opened. With the valves 50 and 51 in such positions the handle 85 can be again moved to close the exhaust valve 88 and open the inlet valve 57, and the table 14 will remain in its downward position, and the necessary repairs may be made.

While this invention has been described herein more or less in detail, it will be understood that changes may be made therein without departing from the spirit of the invention or the scope of the appended claims.

Having thus described my invention, what I claim and desire to protect by Letters Patent is:

1. In a sole cutting machine having a knife, gearing for driving the knife in a circuit around the edge of the sole to be cut, a fixed abutment encompassed by said circuit, a table for carrying sheet stock from which soles are to be cut into the path of said knife and clamping said stock against said abutment, a piston in a cylinder for operating said table towards and away from said abutment to clamp and release said stock, and a valve for controlling the admission and exhaust of fluid under pressure to and from said cylinder for operating said piston, the improvement comprising means geared to said gearing for operating said knife and adapted to operate said valve in timed relation to the movement of said knife, whereby the stock is repeatedly clamped and released by said table when the knife is at specific points on its path of travel.

2. In a sole cutting machine having a knife, gearing for driving the knife in a circuit around the edge of the sole to be cut, a fixed abutment encompassed by said circuit, a table for carrying sheet stock from which soles are to be cut into the path of said knife and clamping said stock against said abutment, a piston in a cylinder for operating said table towards and away from said abutment to clamp and release said stock, the improvement comprising means geared to said knife drive for controlling the flow of fluid under pressure to and from said cylinder for operating said piston to bring said stock within the path of travel of said knife and to clamp it against said abutment when the knife is at certain points on its path of travel, and to release said stock from its clamped position after the knife has traveled to complete circuit around the edge of the sole.

3. In a sole cutting machine having a knife, gearing for driving the knife in a circuit around the edge of the sole to be cut, a fixed abutment encompassed by said circuit, a table for carrying sheet stock from which soles are to be cut into the path of said knife and clamping said stock against said abutment, a piston in a cylinder for operating said table towards and away from said abutment to clamp and release said stock, the improvement comprising means geared to said knife drive for controlling the flow of fluid under pressure to and from said cylinder for operating said piston to bring said stock within the path of travel of said knife and to clamp it against said abutment when the knife is on a certain portion of its path of travel, and to release said stock from its clamped position when the knife is on a certain portion of its path of travel and after the knife has traveled a complete circuit around the edge of the sole, and means for adjusting the geared connection between said knife drive and fluid control to effect a change in the position of the knife on its path of travel when the stock is clamped and released respectively.

4. In a sole cutting machine having a knife, means for driving said knife in a horizontal circuit around the edge of the sole to be cut, a fixed abutment encompassed by the knife circuit, a vertically movable table for supporting the stock from which the soles are to be cut, a piston in a cylinder for moving said table vertically into the path of travel of said knife and to clamp said stock against said abutment, and a valve for controlling the admission and exhaust of fluid under pressure to and from said cylinder for operating said piston towards and away from said abutment, the improvement comprising a cam geared to said knife drive and connected to said valve for operating it in timed relation to the movement of said knife, surfaces on said cam operating in series to admit fluid under pressure to said cylinder to elevate and retain said table in its stock clamping position for at least one revolution of the knife, and to exhaust said fluid immediately after the knife has travelled a complete revolution around the edge of the sole to thereby lower said table and retain said stock out of the path of travel of said knife for less than one revolution of said knife.

5. In a sole cutting machine having a knife, means for driving said knife in a horizontal circuit around the edge of the sole to be cut, a fixed abutment encompassed by the circuit of the knife, a vertically movable table for supporting the stock from which the soles are to be cut, a piston in a cylinder for moving said table vertically in the path of travel of said knife and to clamp said stock against said abutment, and a valve for controlling the admission and exhaust of fluid under pressure to and from said cylinder for operating said piston towards and away from said abutment, the improvement comprising a cam geared to said knife drive and adapted to operate said valve in timed relation to the movement of said knife, surfaces on said cam adapted to operate in series upon said valve to admit fluid under pressure to said cylinder to elevate and carry said stock into the path of travel of said knife at a certain position of said knife on its circuit, and to exhaust said fluid immediately after the knife has travelled a complete circuit around the edge of the sole, and thereby release said stock from its clamped position and move it out of the path of travel of said knife, and means for disconnecting and connecting said cam from said knife drive to permit independent movement of said knife and cam, and thereby change the position of said knife when said stock is carried into the path of travel of said knife.

6. In a sole cutting machine having a knife, means for driving said knife in a circuit around the edge of the sole to be cut from a sheet of sole stock, a fixed abutment encompassed by said circuit, a table for carrying the sole stock into and out of the path of said knife and against said abutment, a piston in a cylinder adapted to operate said table, and a valve for admitting and exhausting fluid under pressure to and from said cylinder to operate said piston, the improvement comprising means responsive to said knife driving means for operating said valve in timed relation to the movement of said knife, whereby said stock is moved into and out of the path of said knife while said knife is at definite pre-selected points on its path every other time said knife passes such points.

7. In a sole cutting machine having a knife, a templet for guiding said knife, a knife drive for driving said knife around said templet, a table for supporting sheet stock from which soles are to be cut, means for moving said table towards and away from said templet to carry said stock into and out of the path of said knife, the improvement comprising means geared to said knife drive for automatically controlling said means for moving said table to carry said stock into and out of the path of travel of said knife while said knife is at preselected points on its path, and means for changing the movement of the table to coincide with the position of the knife at different preselected points.

8. In a sole cutting machine having a knife, a templet for guiding said knife, a knife drive for driving said knife around said templet, a table for supporting a sheet of stock from which soles are to be cut, a piston in a cylinder for moving said table towards and away from said templet to carry said stock into and out of the path of said knife, a valve for admitting and exhausting fluid under pressure to and from said cylinder, the improvement comprising a cam geared to said knife drive, a valve actuating member in contact with the surface of said cam and actuated thereby in synchronism with the travel of said knife, means for shifting said cam to disconnect it from and connect it with said knife drive, and said cam having a face of sufficient width extending in the direction of said shifting movement to maintain contact with said valve actuating member during said shift.

HERBERT R. POLLEYS.

REFERENCES CITED

The following references are of record in the file of this patent:

UNITED STATES PATENTS

| Number | Name | Date |
| --- | --- | --- |
| 282,523 | Hoye | Aug. 7, 1883 |
| 1,691,795 | Anderson | Nov. 13, 1928 |